United States Patent [19]

Byron

[11] Patent Number: 4,484,795
[45] Date of Patent: Nov. 27, 1984

[54] DELAY EQUALIZATION FOR SINGLE MODE OPTICAL FIBERS

[75] Inventor: Kevin C. Byron, Bishop's Stortford, England

[73] Assignee: International Standard Electric Corporation, New York, N.Y.

[21] Appl. No.: 394,250

[22] Filed: Jul. 1, 1982

[30] Foreign Application Priority Data

Jul. 16, 1981 [GB] United Kingdom ............... 8121876

[51] Int. Cl.³ ............................................. G02B 5/172
[52] U.S. Cl. ............................. 350/96.19; 350/96.15; 350/96.30
[58] Field of Search ............... 350/96.15, 96.18, 96.19, 350/96.30, 96.31

[56] References Cited

U.S. PATENT DOCUMENTS 4,201,447  5/1980  Thompson et al. .......... 350/96.15 X
4,229,067 10/1980  Love ................................ 350/96.15
4,260,221  4/1981  Marcuse ......................... 350/96.31

FOREIGN PATENT DOCUMENTS 0065905  5/1980  Japan ............................... 350/96.15

Primary Examiner—John Lee
Assistant Examiner—Akm E. Ullah
Attorney, Agent, or Firm—John T. O'Halloran; Alfred C. Hill

[57] ABSTRACT

The source wavelength dependent delay produced in a single mode fiber is equalized by causing the emergent light beam therefrom to be incident on a dispersion element which is such as to transmit the beam of light at an angle or position dependent on the source wavelength. The transmitted beam of light is launched into a length of multimode fiber such that the beam emergent therefrom is equivalent to the single mode fiber emergent beam but with the delay thereof equalized. If the multimode fiber is step index fiber the transmitted light at which the delay is the least is launched thereinto at the maximum angle, whereas the transmitted light at which the delay is the most is launched thereinto along the axis thereof. Alternatively, a graded index fiber can be employed for the multimode fiber.

10 Claims, 2 Drawing Figures

DELAY EQUALIZATION FOR SINGLE MODE OPTICAL FIBERS

BACKGROUND OF THE INVENTION

This invention relates to fiber optic telecommunication systems and in particular to delay equalization for single mode optical fibers.

A desirable feature of high bandwidth, long haul, optical transmission systems is an overall wavelength independent delay between a source and a detector, whereby the arrival time at the output of a fiber of a pulse launched into it would be independent of the wavelength of the source. However, owing to the effects of material and waveguide dispersion in single mode fibers, the delay of pulses launched into the fiber varies with the wavelength of the source, except for a narrow wavelength range at which the delay is a minimum. Since it is often not practical to construct a single mode fiber for use at the zero dispersion point, that is in the narrow wavelength range, the result is a residual wavelength dependent delay over the spectral range of the source used. It is thus desirable to be able to equalize the delay in these cases.

SUMMARY OF THE INVENTION

An object of the present invention is to provide a method and an arrangement to equalize wavelength dependent delay in single mode optical fibers.

A feature of the present invention is the provision of a method of equalizing wavelength dependent delay in single mode optical fibers comprising the steps of causing a beam of light having varying wavelength emergent from a single mode optical fiber to be incident on a dispersion element which transmits the beam of light at an angle dependent on the wavelength; and launching the transmitted beam of light into a predetermined length of a multimode optical fiber such that the transmitted beam of light emergent therefrom is equivalent to the beam of light emergent from the single mode optical fiber with the delay thereof equalized.

Another feature of the present invention is the provision of an arrangement for equalizing wavelength dependent delay in single mode optical fibers comprising a dispersion element to transmit a beam of light having varying wavelength emergent from a single mode optical fiber at an angle dependent on the wavelength; and a predetermined length of a multimode optical fiber in coupled relationship with the element into which the transmitted beam of light is launched to provide at an output thereof a beam of light equivalent to the beam of light emergent from the single mode fiber with the delay thereof equalized.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
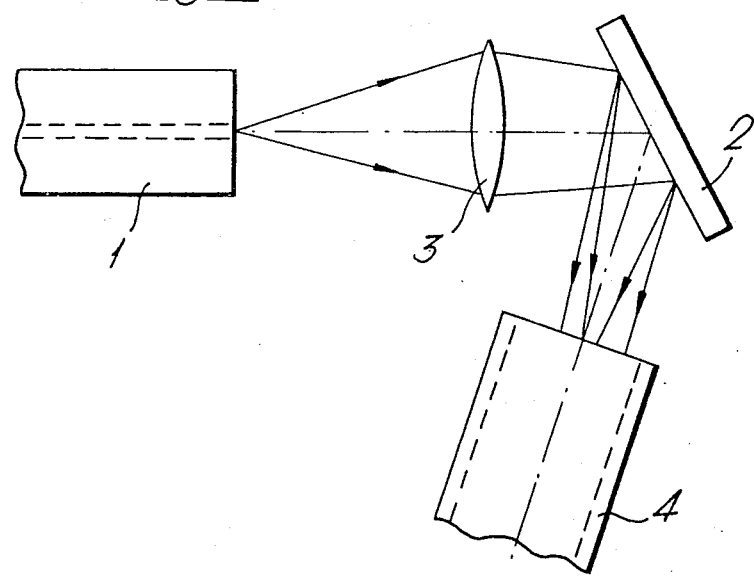
FIG. 1 is a schematic illustration of a first embodiment of an arrangement to equalize wavelength dependent delay in single mode optical fibers employing a step index multimode fiber according to the principles of the present invention.

FIG. 1 shows a single mode fiber 1 into which a light beam has been launched from a source (not shown). The light beam emerging from fiber 1 is caused to be incident on a dispersing element 2, which may comprise a diffraction grating or prism train. A lens 3 may be employed for focussing purposes. The dispersing element 2 is such as to produce an angular dependence with wavelength of the emergent beam. The reflected spot of light is then launched onto the end of a length of multimode step index fiber 4.

The delay at the output of a step index multimode fiber is the greater the larger the angle of launch into the fiber. Thus, the relative delay of a single mode fiber may be equalized by arranging for the emergent transmitted (or reflected) light from element 2 at the wavelength at which the delay is the least, to be launched into the step index multimode fiber 4 at the maximum launch angle, to provide the slowest path therethrough. Similarly, the emergent reflected light from element 2 at which the delay is the greatest is launched on the axis of the step index multimode fiber 4, to provide it with the fastest path therethrough. Thus, variations in the source wavelength are compensated for (equalized). The length of the step index multimode fiber 4 determines the degree of equalization. A desired equalization can be obtained by adjusting or trimming (cutting back) the length of the step index multimode fiber 4.

Figure 2:
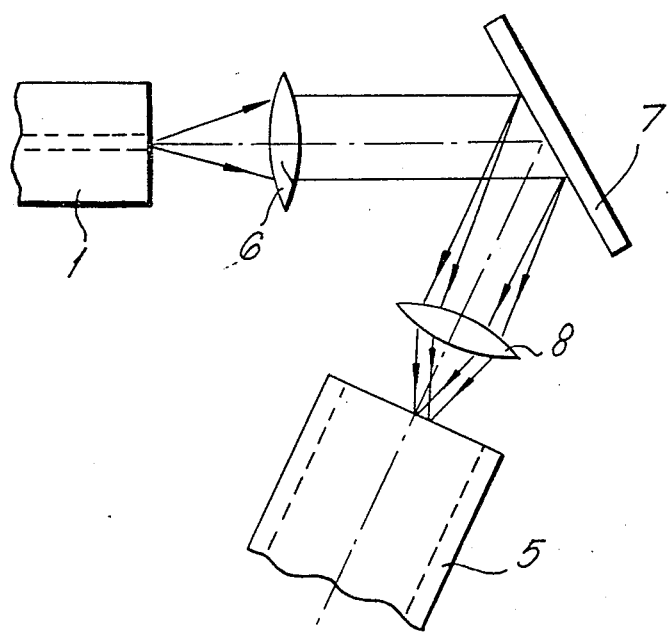
FIG. 2 is a schematic illustration of a second embodiment of an arrangement to equalize wavelength dependent delay in single mode optical fibers employing a graded index multimode fiber.

The embodiment of FIG. 2 employs a graded index multimode fiber 5, with a non-optimized $\alpha$ value, instead of the step index multimode fiber 4 of FIG. 1. In this embodiment the light emerging from single mode fiber 1 is collimated, by a lens 6, incident on a dispersing element 7 and the reflected light is focussed onto the end of fiber 5 by a lens 8.

Changes in the wavelength of the source at the launch end of the single mode fiber result in a change in angle on reflection from dispersing element 7 and a shift in the launch spot position on the graded index multimode fiber 5.

Since the relative delay in a multimode, non-optimized graded index fiber is dependent on launch position, provided that only a few modes are launched, the relative delay in the single mode fiber 1 is equalized by arranging for the emerging light from element 7 at the wavelength at which the delay is least, to be incident at the edge of the core (for an undercompensated profile) of the graded index multimode fiber 5 to provide the slowest path therethrough. Similarly, the emerging light from element 7 at the wavelength at which the delay is the greatest is launched on the axis of the graded index multimode fiber 5 to provide the fastest path therethrough. For an overcompensated profile in the graded index multimode fiber 5, these positions of launch are reversed.

FIG. 6.4 at page 92 of the book entitled "Optical Fibers for Transmission" by John E. Midwinter, 1979, shows that that in a multimode graded index fiber having an uncompensated parabolically graded refractive-index profile, high order modes travel faster than lower order modes and that in a multimode graded index, fiber having an overcompensated parabolically graded refractive-index profile, lower order modes travel faster than higher order modes. Thus, the point across the diameter of a fiber at which light is lauched into an overcompensated and an undercompensated fiber determines the speed at which the light will travel, thereby enabling delay compensation or equalization.

As in the embodiment of FIG. 1, the dispersion element 7 may comprise a diffraction grating or prism train, and the actual equalization is trimmed (adjusted) by cutting back the length of the graded index multimode fiber 5 to give the desired equalization.

For a 1 km (kilometer) length of single mode fiber having a zero dispersion at 1.34 μm (micrometer), twenty meters of step index fiber provide delay equalization up to wavelengths of at least 1.6 μm.

While I have described above the principles of my invention in connection with specific apparatus it is to be clearly understood that this description is made only by way of example and not as a limitation to the scope of my invention as set forth in the objects thereof and in the accompanying claims.

I claim:

1. A method of equalizing wavelength dependent delay in single mode optical fibers comprising the steps of
    causing a beam of light having varying wavelengths emergent from a single mode optical fiber to be incident on a dispersion element which transmits said beam of light at an angle dependent on said wavelength; and
    launching said transmitted beam of light into a predetermined length of a multimode optical fiber such that said transmitted beam of light emergent therefrom is equivalent to said beam of light emergent from said single mode optical fiber with said delay thereof equalized.

2. A method according to claim 1, wherein
    said multimode optical fiber is a step index multimode optical fiber having a longitudinal axis;
    said transmitted beam of light having a wavelength at which said delay is the least is launched into said step index multimode optical fiber at a maximum launch angle, and
    said transmitted beam of light having a wavelength at which said delay is the greatest is launched into said step index multimode optical fiber along said axis.

3. A method according to claim 1, wherein
    said multimode optical fiber is a graded index multimode optical fiber having a core, a longitudinal axis, a non-optimized α-value and an undercompensated index profile,
    said transmitted beam of light having a wavelength at which said delay is the least is launched into said graded index multimode fiber at the edge of said core, and
    said transmitted beam of light having a wavelength at which said delay is the greatest, is launched into said graded index multimode fiber along said axis.

4. A method according to claim 1, wherein
    said multimode optical fiber is a graded index multimode optical fiber having a core, a longitudinal axis, a non-optimized α-value and an overcompensated index profile,
    said transmitted beam of light having a wavelength at which said delay is the least is launched into said graded index multimode fiber along said axis, and
    said transmitted beam of light having a wavelength at which said delay is the greatest is launched into said graded index multimode fiber at the edge of said core.

5. A method according to claims 1, 2, 3 or 4, wherein
    said delay equalization is adjustable by adjusting said predetermined length of said multimode fiber.

6. An arrangement for equalizing wavelength dependent delay in single mode optical fibers comprising:
    a dispersion element to transmit a beam of light having varying wavelength emergent from a single mode optical fiber at an angle dependent on said wavelength; and
    a predetermined length of a multimode optical fiber in coupled relationship with said element into which said transmitted beam of light is launched to provide at an output thereof a beam of light equivalent to said beam of light emergent from said single mode fiber with said delay thereof equalized.

7. An arrangement according to claim 6, wherein
    said multimode fiber is a step index multimode optical fiber.

8. An arrangement according to claim 6, wherein
    said multimode fiber is a graded index multimode optical fiber having a non-optimized α-value and an undercompensated index profile.

9. An arrangement according to claim 6, wherein
    said multimode fiber is a graded index multimode optical fiber having a non-optimized α-value and an overcompensated index profile.

10. An arrangement according to claims 6, 7, 8 or 9, wherein
    said delay equalization is adjustable by adjusting said predetermined length of said mutlimode fiber.

* * * * *